United States Patent [19]

Laird

[11] Patent Number: 4,819,767

[45] Date of Patent: Apr. 11, 1989

[54] HAND BRAKE APPARATUS FOR HAND TRUCKS

[76] Inventor: Oscar B. Laird, 13430 Bandera, Houston, Tex. 77015

[21] Appl. No.: 95,107

[22] Filed: Sep. 11, 1987

[51] Int. Cl.⁴ ............................ B60T 1/04; B60T 7/10
[52] U.S. Cl. ...................................... 188/2 D; 188/21; 188/71.1; 188/71.3; 188/72.7; 188/196 M
[58] Field of Search .................. 188/2 D, 2 F, 10, 11, 188/15, 19, 20, 21, 22, 59, 71.1, 71.3, 72.7, 72.9, 196 M; 280/87.04 A

[56] References Cited

U.S. PATENT DOCUMENTS

| | | | |
|---|---|---|---|
| 301,434 | 7/1884 | Cyr | 188/21 X |
| 1,142,880 | 6/1915 | Hartman | 188/727 X |
| 1,416,427 | 5/1922 | Volkman | 188/22 |
| 2,037,432 | 4/1936 | Oliver | 188/196 M |
| 2,948,558 | 8/1960 | Schultz | 188/196 M X |
| 3,664,465 | 5/1972 | Holland | 188/10 |
| 3,954,160 | 5/1976 | Carr | 188/72.7 X |
| 4,076,266 | 2/1978 | Krausz | 188/72.7 X |
| 4,134,599 | 1/1979 | Di Mille et al. | 188/72.7 X |
| 4,142,732 | 3/1979 | Boyd | 188/22 X |
| 4,418,796 | 12/1983 | Rittmann | 188/196 M X |
| 4,717,168 | 1/1988 | Moon, Jr. | 188/19 X |

FOREIGN PATENT DOCUMENTS 663 of 1888 United Kingdom .................. 188/20

Primary Examiner—George E. A. Halvosa
Attorney, Agent, or Firm—Kenneth A. Roddy

[57] ABSTRACT

A hand brake apparatus for installation on wheeled trucks of the type having a load supporting frame and at least two laterally opposed support wheels having a fixed direction supporting the frame for movement over the ground and a handle portion for moving and directing the load supporting frame. One embodiment of the apparatus comprises a singular tubular housing attached to the load supporting frame horizontally between and parallel to the rotational axis of two laterally opposed support wheels having a fixed direction. A pair of opposed extensible wheel engaging members carried within the housing extend outwardly from each end thereof and are provided with a resilient brake disc to engage the sidewall of the stationarily mounted support wheels and thereby prevent rotation of the wheels. A compression spring maintains the extensible wheel engaging members in a normally retracted position spaced inwardly adjacent the wheel sidewall. Alternatively, two smaller housings may be installed adjacent the stationarily mounted wheels and each carries a single extensible wheel engaging member to engage the sidewall of the stationarily mounted support wheels. The extensible members are actuated by a hand grip lever attached to the truck handle.

6 Claims, 5 Drawing Sheets

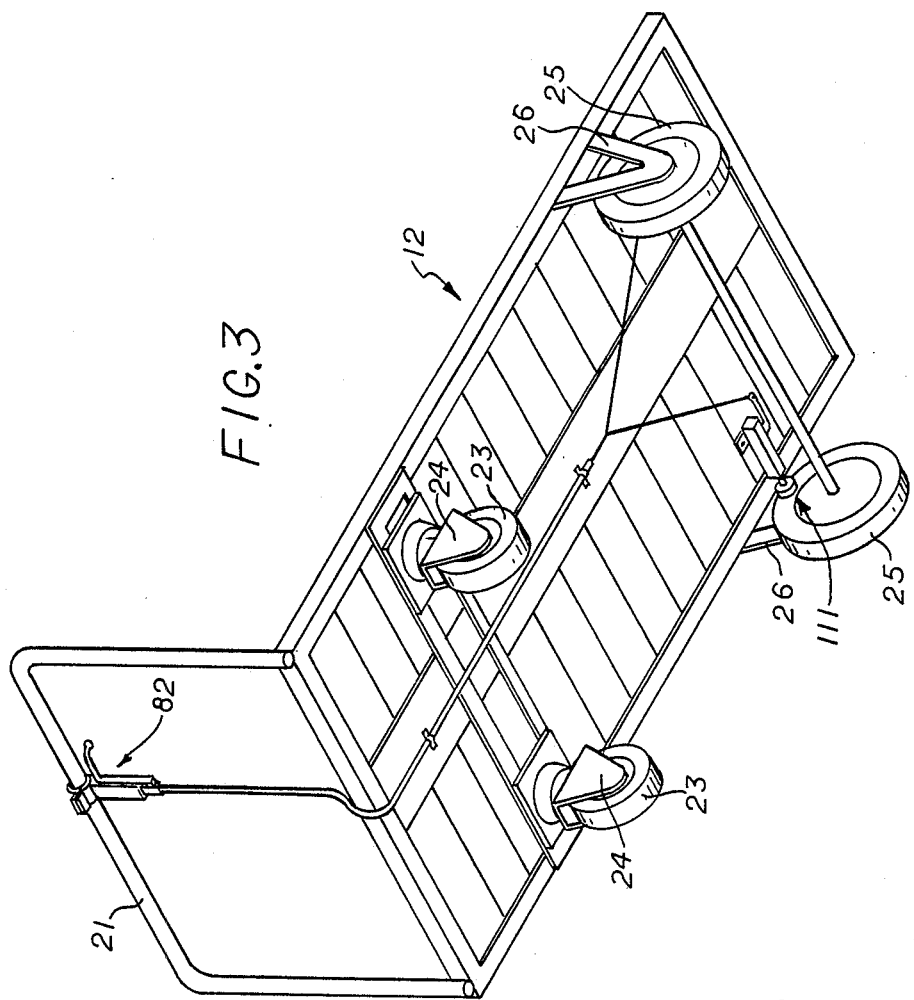
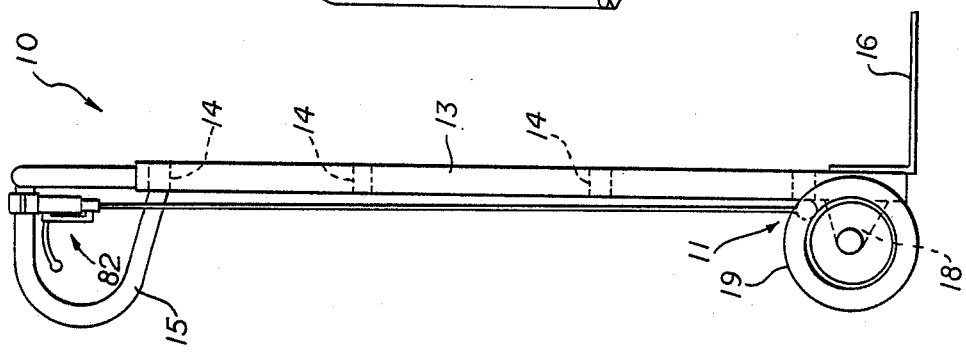
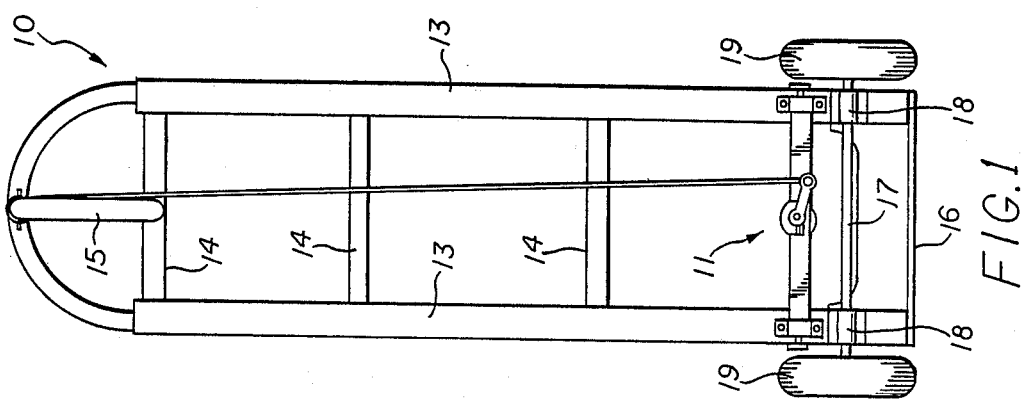

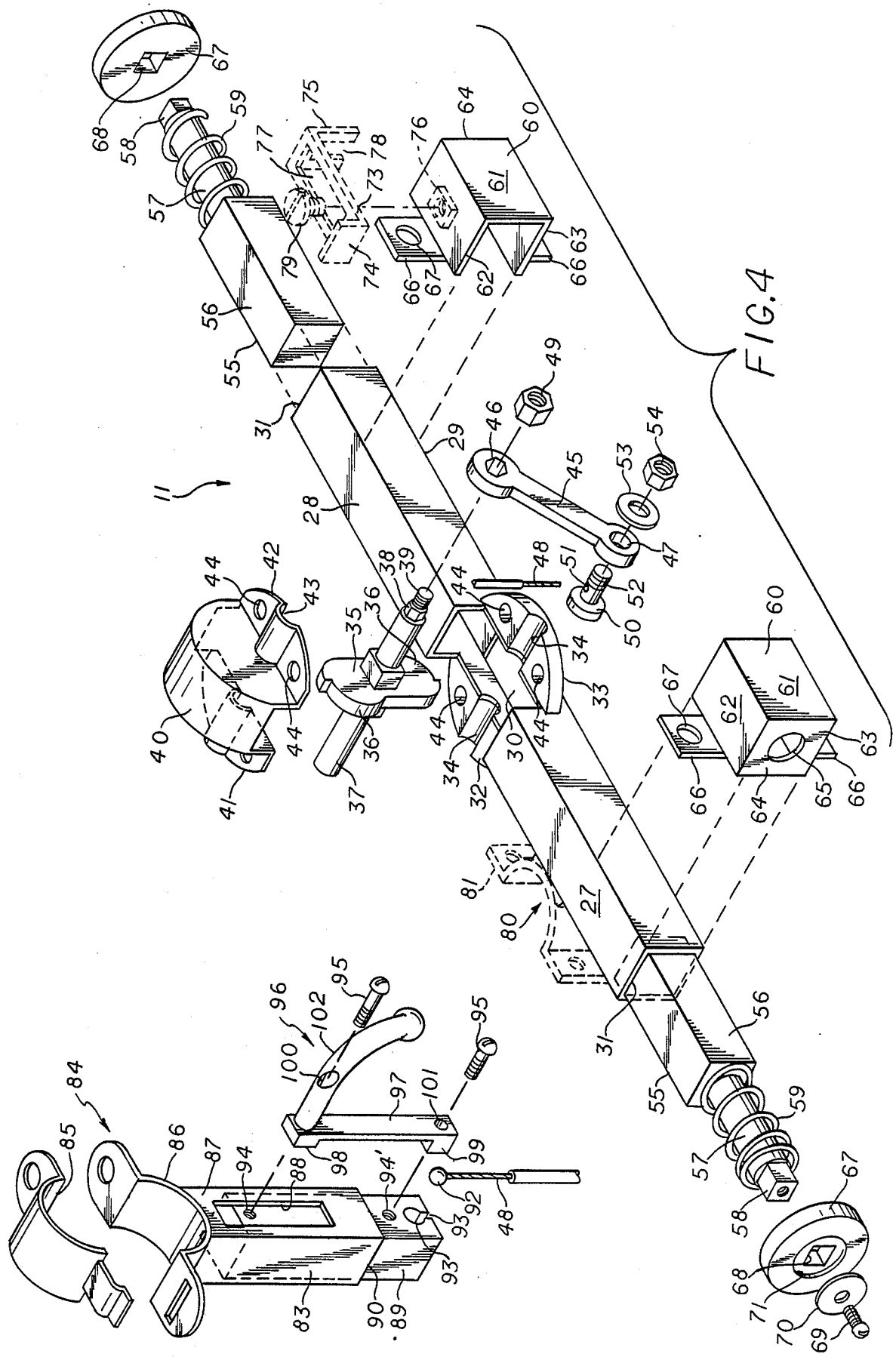

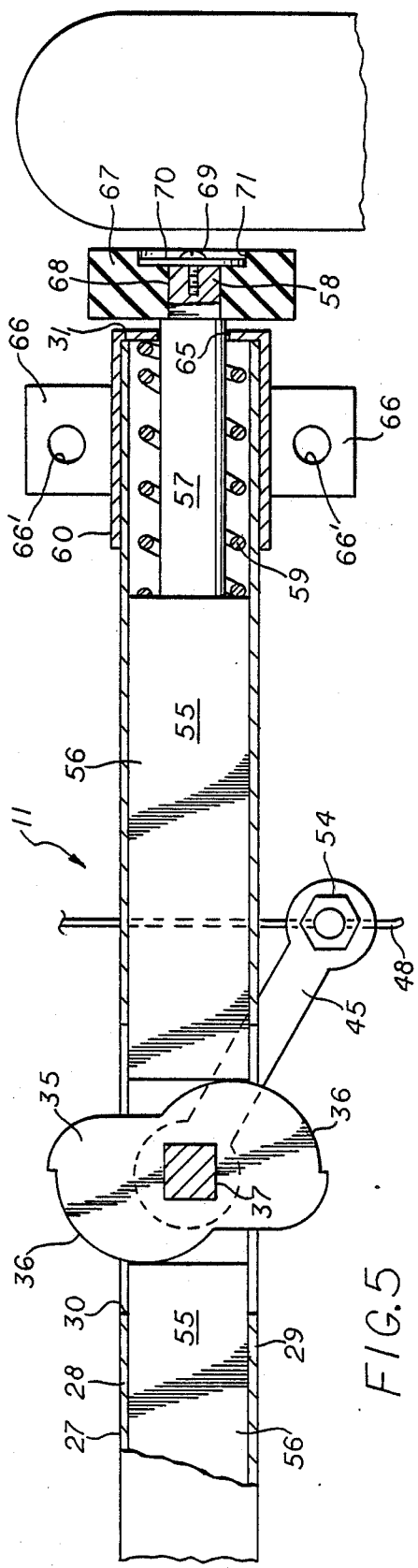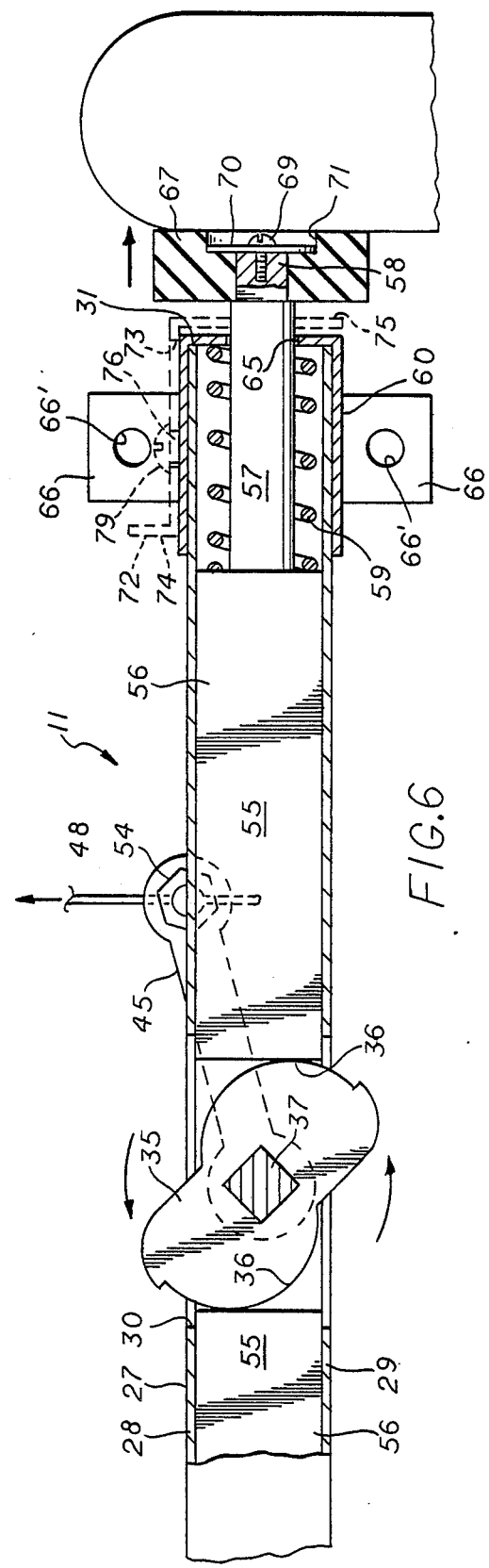

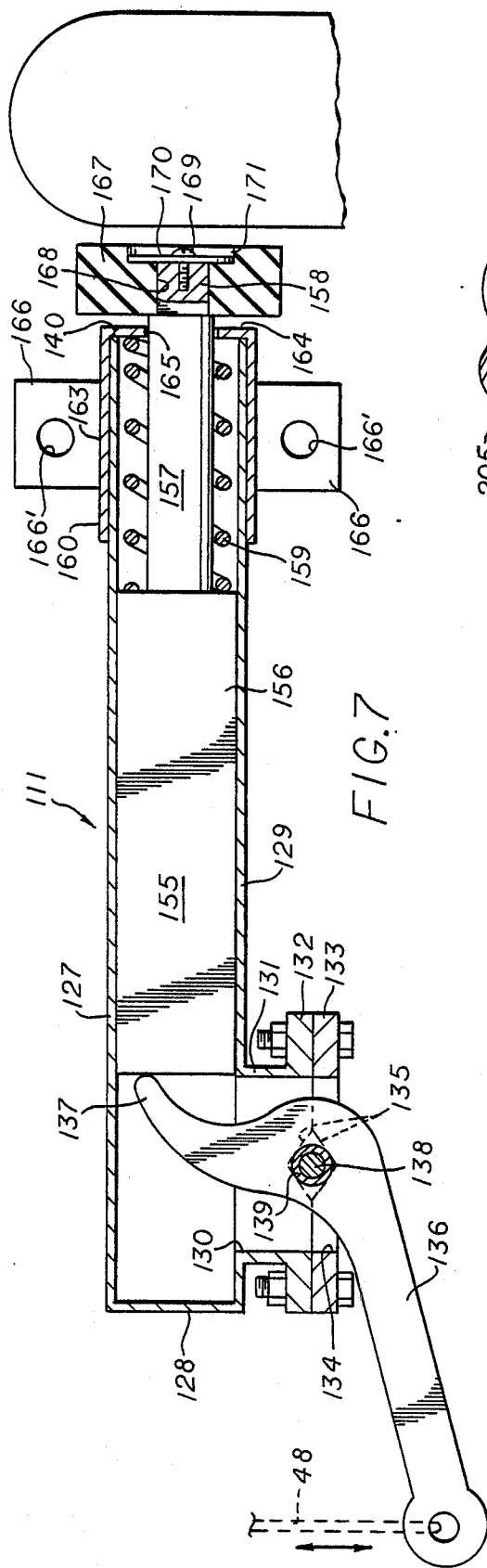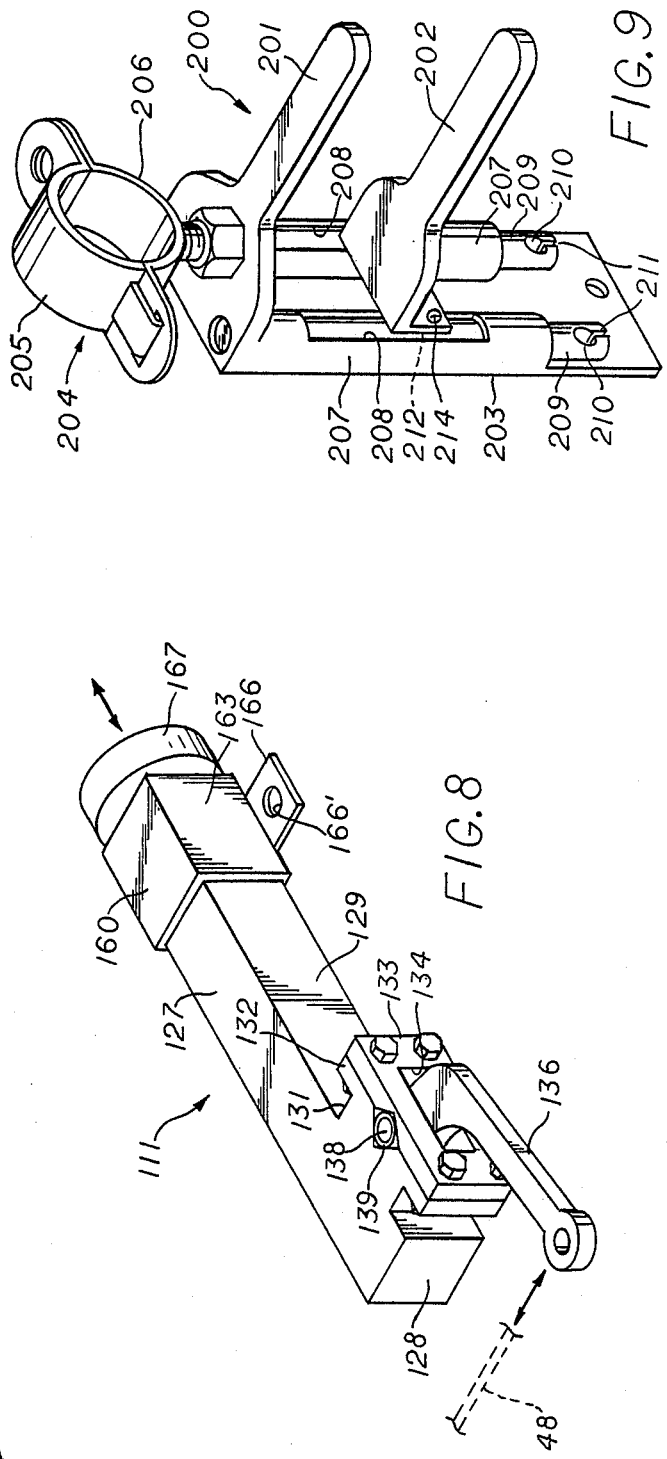

HAND BRAKE APPARATUS FOR HAND TRUCKS

BACKGROUND OF THE INVENTION

1. Field of the Invention

This invention relates generally to hand propelled carts or trucks, and more particularly to a hand brake apparatus for hand propelled trucks.

2. Brief Description of the Prior Art

Braking systems for carts are known in the art. There are several patents which disclose various hand propelled carts and trucks having hand brakes.

Volkman, U.S. Pat. No. 1,416,427 discloses a hand truck with a brake system utilizing a pawl and ratchet mechanism on the wheels.

Klemm et al, U.S. Pat. No. 3,134,461 discloses brake system for steerable running gear assemblies.

Sanders et al, U.S. Pat. No. 3,174,768 discloses a four wheeled luggage cart with a brake system utilizing a drop rod and notched discs on the wheels.

Honeyman, U.S. Pat. No. 3,276,550 discloses a hand truck having a braking system utilizing a pivoting rod which frictionally engages the wheel surface.

Barron, U.S. Pat. No. 3,422,930 discloses a hand truck with a brake system utilizing a friction strap and brake drums on the wheels.

Malloy, U.S. Pat. No. 3,486,587 discloses a hand truck with a brake system which has pivotal linkage controlled by a hand lever. Friction pads at the end of the linkage contact the wheel surface. The brakes may be applied to each wheel independently or together.

Anderson, U.S. Pat. No. 4,018,449 discloses a shopping cart with a braking system utilizing a spring loaded toggle plate which contacts the wheels. The braking mechanism allows automatic release of the brakes during normal activities with the hands on the handle and will lock when the handle is released.

Boyd, U.S. Pat. No. 4,142,732 discloses a hand truck having a series of pairs of wheels and is capable of climbing stairs. The a hand truck has a brake system utilizing a friction strap and a brake drum on the plate carrying the wheel axles.

The present invention is distinguished over the prior art in general, and these patents in particular by a hand brake apparatus which in one embodiment comprises a singular tubular housing attached to the load supporting frame horizontally between and parallel to the rotational axis of two laterally opposed support wheels having a fixed direction. A pair of opposed extensible wheel engaging members carried within the housing extend outwardly from each end thereof and are provided with a resilient brake disc to engage the sidewall of the stationarily mounted support wheels and thereby prevent rotation of the wheels. A compression spring maintains the extensible wheel engaging members in a normally retracted position spaced inwardly adjacent the wheel sidewall. Alternatively, two smaller housings may be installed adjacent the stationarily mounted wheels and each carries a single extensible wheel engaging member to engage the sidewall of the stationarily mounted support wheels. The extensible members are actuated by a hand grip lever attached to the truck handle.

SUMMARY OF THE INVENTION

It is therefore an object of the present invention to provide an improved hand truck having hand brake apparatus which will allow the user to brake a heavily loaded truck safely with one hand.

It is another object of this invention to provide a hand brake apparatus which may be easily installed on existing wheeled trucks having at least two laterally opposed support wheels having a fixed direction.

Another object of this invention is to provide a hand brake apparatus for installation on wheeled trucks featuring a hand actuating member which is closely adjacent the handle portion of the truck whereby the user may stop the truck by squeezing the brake actuating member and the handle of the truck together.

Another object of this invention is to provide a hand brake apparatus for installation on wheeled trucks which will automatically disengage from the truck wheel when the actuating member is released.

A further object of this invention is to provide a hand brake apparatus for installation on wheeled trucks which may be easily and simply installed and removed from the truck frame.

A still further object of this invention is to provide a hand brake apparatus for installation on wheeled trucks which is simple in construction, economical to manufacture, and rugged and durable in use.

Other objects of the invention will become apparent from time to time throughout the specification and claims as hereinafter related.

The above noted objects and other objects of the invention are accomplished by a hand brake apparatus which in one embodiment comprises a singular tubular housing attached to the load supporting frame horizontally between and parallel to the rotational axis of two laterally opposed support wheels having a fixed direction. A pair of opposed extensible wheel engaging members carried within the housing extend outwardly from each end thereof and are provided with a resilient brake disc to engage the sidewall of the stationarily mounted support wheels and thereby prevent rotation of the wheels. A compression spring maintains the extensible wheel engaging members in a normally retracted position spaced inwardly adjacent the wheel sidewall. Alternatively, two smaller housings may be installed adjacent the stationarily mounted wheels and each carries a single extensible wheel engaging member to engage the sidewall of the stationarily mounted support wheels. The extensible members are actuated by a hand grip lever attached to the truck handle.

BRIEF DESCRIPTION OF THE DRAWINGS

FIG. 1 is a rear elevation of a two wheeled truck having hand brake apparatus in accordance with the present invention installed thereon.

FIG. 2 is a side elevation of the two wheeled truck of FIG. 1.

FIG. 3 is an isometric view showing the underside of a four wheeled platform truck having an alternate embodiment of the hand brake apparatus installed thereon.

FIG. 4 is an exploded isometric view of the embodiment of the hand brake apparatus shown in FIGS. 1 and 2.

FIG. 5 is a partial longitudinal cross section of the wheel engaging portion of the hand brake embodiment of FIG. 4 in the disengaged position.

FIG. 6 is a partial longitudinal cross section of the wheel engaging portion of the hand brake embodiment of FIG. 4 in the engaged position.

FIG. 7 is an isometric view of the alternate embodiment of the hand brake apparatus shown in FIG. 3.

FIG. 8 is a longitudinal cross section of the wheel engaging portion of the hand brake embodiment of FIG. 7 in the disengaged position.

FIG. 9 is an isometric view of an alternate hand lever mechanism.

DESCRIPTION OF THE PREFERRED EMBODIMENT

Referring to the drawings by numerals of reference, there is shown in FIGS. 1 and 2, a two wheeled cart or truck 10 having hand brake apparatus 11 in accordance with the present invention installed thereon, and in FIG. 3, a four wheeled platform truck 12 having an alternate embodiment 111 of the hand brake apparatus in accordance with the present invention installed thereon.

The two wheeled truck 10 comprises two elongated, generally parallel load supporting frame members 13 which are joined at intermediate points by cross frame members 14. A curved handle member 15 is secured to the upper cross frame members in such a manner as to be downwardly disposed when the frame members 13 are horizontally disposed. A load engaging lip or flange 16 is secured between the bottom portion of frame members 13 and extends outwardly forward therefrom in the direction opposite that of the handle 15.

An axle rod 17 extends between axle support brackets 18 secured to the lower portion of the frame members 13. Wheels 19 are rotatably mounted on the ends of the axle 17, or otherwise rotatably mounted on the truck frame in a conventional manner to have a fixed direction.

Referring now to FIG. 3, the four wheeled platform truck 12 comprises an elongated bed or load supporting platform 20 having a tubular handle member 21 secured at one end to extend perpendicularly upward therefrom.

A pair of rear wheels 23 are rotatably mounted in yokes 24 which are mounted at the end of the truck frame nearest the handle 21. The rear wheel yokes 24 are mounted to rotate about the vertical axis. A pair of front wheels 25 are rotatably mounted in stationary yokes or wheel brackets 26 which are secured near the front end of the truck frame and do not rotate about the vertical axis but have a fixed direction relative to the truck frame.

Referring now additionally to FIGS. 4, 5, and 6 the details of construction of the hand brake apparatus shown in FIGS. 1 and 2 will be described. The hand brake assembly 11 comprises an elongate rectangular housing 27 of square tubing. The top and bottom walls 28 and 29 of the housing 27 are cut out to form a vertical opening 30 centrally between the opposed open ends 31. Flanges 32 and 33 are secured to the housing side walls to extend outwardly from the opening 30 and are provided with an arcuate depression or trough 34 extending transversely outward from the opening.

A flat, generally rectangular cam member 35 having opposed outwardly curved lobes 36 at each end is received in the housing opening 30. The cam member 35 has a shaft 37 extending centrally therethrough transverse to its longitudinal axis. One of the outwardly extended ends of the shaft 37 is provided with a hexagonal portion 38 and terminates in a threaded portion 39. The shaft 37 is rotatably supported in the trough 34.

A cavitated cover member 40 is secured to the housing 27 to cover the top of the opening 30 and a similar cavitated cover member (not shown) is secured to the underside of the housing to cover bottom of the opening. The cover members 40 have outwardly extending flanges 41 and 42 and the flanges of the top cover are provided with an arcuate depression or trough 43 extending transversely outward from the cavity and correspond to the housing flanges 32 and 33. The cover members 40 are removably secured to housing 27 by bolts (not shown) extending through holes 44 in the flanges. Only one cover member has been shown in FIG. 4, but it should be understood that the bottom cover member is essentially a mirror image of the top cover member 40 with the exception that its flanges do not contain a trough.

A rectangular link member 45 is connected to the shaft 37 to rotate the cam member 35. The link member 45 has a hexagonal aperture 46 through one end which is received on the shaft hexagonal portion 38 and a circular aperture 47 through the opposed end which is connected to one end of an actuating flexible cable 48. A nut 49 threadedly received on the threaded portion 39 of the shaft secures the link member 45 thereon. It should be understood that the hexagonal connection allows the link member to be secured to the shaft at variable angles relative to the shaft axis for altering the amount of travel of the link member to rotate the cam member 35.

The flexible cable 48 is secured at one end to the opposed end of the link member 45 by a headed pin 50 received through the link aperture 47 with the cable end inserted in a small aperture 51 through its shank. The end of the shank of the pin 50 is threaded 52 and receives a washer 53 and nut 54 to connect the cable 48 to the end of the link member 45.

A rectangular plunger bar 55 is slidably received in each open end 31 of the rectangular housing 27. Each plunger bar 55 is has a rectangular portion 56 and an elongate cylindrical portion 57 which extends outwardly therefrom and terminates in a square portion 58. The inwardly facing ends of the rectangular portions 56 contact the cam lobes 36. The cylindrical portions 57 of the plunger bars 55 extend outwardly a short distance beyond the open ends 31 of the housing 27 when the ends of the rectangular portions are in contact with the lobes 36. A compression spring 59 is carried on each cylindrical portion 57.

An end cap 60 is installed over each end of the housing 27 to enclose the open ends 31 and capture the spring 59 inside the housing. Each end cap has a front, top, bottom and side wall 61, 62, 63, and 64 respectively. The end walls 64 are provided with a hole 65 in axial alignment with the cylindrical portions 57 and through which the cylindrical portions slidably extend. A pair of opposed rectangular mounting flanges 66 extend vertically above and below the end cap 60 and are provided with holes 66' for mounting the housing 27 on the truck frame members.

A disc-shaped brake pad 67 of resilient material having a central square aperture 68 is received on the square portion 58 of each plunger bar cylindrical portion 57 and is secured thereon by a screw 69 and a washer 70 installed therebetween. The outer surface of the brake pad 67 may be recessed at 71 such that the head of the screw and the washer is below the outer side surface of the pad.

Optionally, as indicated in dotted line, an adjustment bracket 72 may be installed at one or both ends of the housing 27 to compensate for misalignment or irregularity of the truck wheels. The adjustment bracket 72 comprises a flat strap bent to form a flat central portion 73 and an upwardly extending tab 74 at one end and a depending leg portion 75 at the opposite end. A square nut 76 is secured to the top wall 62 of the end cap 60. The central portion 73 of the bracket 72 is provided with a slot 77 which is received on the nut 76 and allows the bracket 72 to slide longitudinally on the cap 60. The depending leg 75 is slotted 78 to receive the cylindrical portion 57 of the plunger bar 55. The bracket is releasably secured to the cap 60 by a large headed screw 79.

To adjust the bracket 72, the screw 79 is loosened and the tab 74 is pushed outward to place the depending leg 75 at the desired distance from the side wall 64 of the end cap and the screw is retightened. The depending leg 75 will contact the inward facing surface of the brake pad when it is retracting, and will provide a means of adjusting the outward travel required by one plunger relative to the other. The travel adjustment prevents one brake pad from contacting a wheel before the other and aids in providing simultaneous contact of the brake pads even though one wheel may be worn or wobbles excessively.

To adapt the wheel engaging portion to fit truck frames having a tubular framework, the housing 27 may also be provided with a clamp assembly 80 secured to the sidewall for attaching the housing to the tubular truck frame members adjacent the wheels. The clamp assembly 80 has one arcuate clamp element 81 secured to the sidewall and the mating arcuate clamp element (not shown) would be releasably secured thereto in a conventional manner.

This completes the wheel engaging portion of the hand brake system which is installed horizontally between the wheels of the truck. The upper assembly of the hand brake system comprises the hand lever mechanism which is installed on the upper portion of the truck to activate the lower assembly.

The hand lever mechanism designated generally as 82 comprises an elongate rectangular member 83 of square tubing. A clamp assembly 84 at the top of the rectangular member 83 has an upper arcuate clamp element 85 and a lower arcuate clamp element 86 which are bolted or otherwise releasably secured to the truck handle 15 or 21. The side wall 85 of the rectangular member is provided with a rectangular opening or slot 88.

A rectangular bar 89 is slidably received in the open bottom end 90 of the rectangular member 83. The lower end of the bar 89 extends outwardly beyond the open end 90 of the rectangular member 83 in the assembled condition. The exposed lower end of the bar 89 is provided with an aperture 91 which receives the top end of the flexible cable 48. The top end of the cable 48 may be provided with a bead 92 or other protuberance which is received in the aperture 91. A slot 93 extends downwardly from the aperture 91 to the end of the bar 89 to receive the upper portion of the cable 48.

A pair of spaced axially aligned threaded holes 94 and 94' are provided on one surface of the bar 89. Hole 94 is disposed in the upper portion of the rectangular opening 88 and hole 94' is located on the exposed lower end of the bar 89 when it is installed within the rectangular member 83.

A hand lever member 96 is secured to the bar 89 to manually move it up and down within the rectangular member 83. The hand lever member comprises a rectangular plate 97 having a square protuberance 98 and 99 at each end through which holes 100 and 101 extend. The protuberance 98 at the top end is slidably received within the rectangular slot 88 and the hand lever member 96 is secured to the bar 78 by screws 95. The protuberances 98 and 99 extend outward from the plate 97 sufficient to prevent the plate from rubbing on the side wall of the rectangular member 83. A curved rod or hand grip member 102 extends downward from the top of the plate 97 on the side opposite the protuberances 98 and 99.

Referring now to FIGS. 7 and 8, an alternate embodiment 111 of the hand brake apparatus as depicted in FIG. 3 will be described. The alternate embodiment allows for variations in the lateral spacing of the wheels of the truck. Rather than one housing disposed centrally between the wheels, the alternate embodiment utilizes two separate wheel engaging assemblies, one adjacent each stationarily mounted wheel.

The hand brake assembly 111 comprises an elongate rectangular housing 127 of square tubing having one enclosed end 128. The sidewall 129 of the housing is cut out to form a longitudinal slot or opening 130 near the enclosed end 128. A rectangular tubular extension 131 secured to the housing side wall 129 surrounds the opening 130 and extends laterally outward from the opening. A flange 132 is secured to the extended end of the extension 130 and releasably receives a mating flange 133 which is bolted thereon. The mating flange 133 is provided with a longitudinal rectangular opening 134. The flanges 132 and 133 are each provided with an arcuate depression 135 extending transversely along the mating surfaces.

A generally rectangular curved lever member 136 having an outwardly curved lobe 137 at one end is pivotally supported between the flanges 132 and 133 with the curved lobe 136 received in the housing opening 130 and the remaining portion of the lever extending outwardly through the flange opening 134. The lever member 136 has a shaft 138 extending therethrough transverse to its longitudinal axis. A tubular sleeve or bearing 139 is slidably received on each outwardly extended end of the shaft 138. The tubular sleeves r bearings 139 are clamped between the arcuate depressions 135 to rotatably support the lever member 136 between the flanges. The lever member 13 has an aperture 147 through the extended end which is connected to one end of the actuating flexible cable 48 in a conventional manner.

A rectangular plunger bar 155 is slidably received in the open end 140 of the rectangular housing 127. The plunger bar 155 is has a rectangular portion 156 and an elongate cylindrical portion 157 which extends outwardly therefrom and terminates in a square portion 158. The inwardly facing end of the rectangular portion 156 contacts the curved lobe 137. The cylindrical portion 157 of the plunger bar 155 extends outwardly a short distance beyond the open end 140 of the housing 27 when the end of the rectangular portion is contact with the lobe 137. A compression spring 159 is carried on each cylindrical portion 57.

An end cap 160 is installed over the open end 140 of the housing 127 to enclose the open end and capture the spring 159 inside the housing. The end cap is a section of square tubing having a square sidewall 163 and an end wall 164. The end wall 164 is provided with a hole 165 in axial alignment with the cylindrical portion 157 and through which the cylindrical portion slidably extends. A pair of opposed rectangular mounting flanges 166 extend outwardly from the end cap sidewall 163 and are provided with holes 166' for mounting the housing 127 on the truck frame members.

A disc-shaped brake pad 167 of resilient material having a central square aperture 168 is received on the square portion 158 of the plunger bar cylindrical portion 157 and is secured thereon by a screw 169 and a washer 170 installed therebetween. The outer surface of the brake pad 167 may be recessed at 171 such that the head of the screw and the washer is below the outer side surface of the pad.

Optionally, as previously described, an adjustment bracket (not shown) may be installed at the brake disc end of the housing 127 to compensate for misalignment or irregularity of the truck wheels. The adjustment bracket has been previously described and will not be repeated to avoid repetition.

Having thus described the components of two embodiments of the hand brake assembly, it should be understood that the hand lever mechanism is installed on the upper portion of the truck and operatively connected by the flexible cable to the lower wheel engaging portion which is installed horizontally between the wheels of the truck. The alternate embodiment allows for variations in the lateral spacing of the wheels of the truck. Rather than one housing disposed centrally between the wheels, the alternate embodiment utilizes two separate wheel engaging assemblies, one adjacent each stationarily mounted wheel.

FIG. 9 shows and alternate hand lever mechanism 200 which has an upper fixed hand grip 201 and a lower movable hand grip 202. The hand lever 200 may be attached to trucks where the truck handle does not lend itself to being used as the opposing stationary grip for the movable grip operating the cable. The hand lever 200 comprises a generally rectangular housing frame 203 of flat plate. A clamp assembly 204 at the top of the fixed hand grip 201 has an upper arcuate clamp element 205 and a lower arcuate clamp element 206 which is bolted or otherwise releasably secured to the fixed hand grip 205. The opposing longitudinal side walls of the rectangular plate 203 are curved over to form a pair of parallel tubular sleeves 207 and each sleeve is provided with a rectangular opening or slot 208.

A round bar or rod 209 is slidably received in the open bottom end of the sleeves 207. The lower end of the rod 209 extends outwardly beyond the open end of the sleeves 207 in the assembled condition. The exposed lower end of each rod 209 is provided with a transverse aperture 210 which receives the top end of the flexible cable. The top end of the cable may be provided with a bead or other protuberance which is received in the aperture 210. A slot 211 extends downwardly from the aperture 210 to the bottom of the rod to receive the upper portion of the cable.

A pair of spaced axially aligned threaded holes 212 are provided one on the outer surface of each rod to reside within the slots 208. The movable hand grip 202 is secured to the rods 209 to manually move it up and down within the sleeves 207. The hand grip 202 has a depending rectangular plate 213 having a pair of holes (not shown) therethrough in axial alignment with the holes 212 in the rods and is secured to the rods by screws 214. When it is desired to activate the hand brake, the user grips the stationary hand grip and pulls up on the movable hand grip which raises the rods inside the sleeves of the hand lever assembly. This pulls the cable upward to pivot the linkage which operates the plunger mechanism.

OPERATION

Referring again to FIGS. 1, 2, and 3, the hand brake apparatus may be installed on existing conventional carts having a pair of parallel wheels the axles or supporting yokes of which are fixed to the truck frame, such as dollies and grocery carts. The rectangular housing may be manufactured in various lengths to fit a variety of wheel spacings.

The rectangular housing containing the above described components is attached to the generally parallel load supporting truck frame members or to the truck cross frame members by bolting through the end cap flanges. The rectangular housing is attached in a horizontal position above and parallel to the wheel axis of rotation such that the brake pad and plunger bar axis it aligned with the wheel sidewalls.

The hand lever mechanism is installed by clamping the clamping elements in a convenient location on the upper portion of the truck such as on the curved handle whereby the hand grip member is easy reach of the hand of the user.

The link member may be removed and secured in a position on the hexagonal portion of the cam shaft whereby the pivotal travel of the link member will push the plunger bars outwardly from each end of the housing to make simultaneous contact of the brake pads against the sidewalls of the opposed wheels. The lower end of the flexible cable is secured at the free end of the link member in the headed pin connection.

When it is desired to activate the hand brake, the user merely pulls up on the hand grip member which raises the rectangular bar inside the rectangular housing of the hand lever assembly. This pulls the cable upward to pivot the link which rotates the cam and the cam lobes force the plunger bars outwardly from each end.

The brake pads at the ends of the plunger bars frictionally engage the wheel sidewalls to prevent them from rotating and effectively stops the movement of the truck. When the hand grip member is released, the compression spring retracts the plunger bars inwardly to disengage the brake pads from the wheel sidewalls.

If one of the wheels is misaligned or wobbles excessively, the brake pads may not contact both sidewalls simultaneously. In this situation, the adjustment bracket (shown in dotted line) may be installed at one or both ends of the rectangular housing. To adjust the bracket, the large headed screw is loosened and the bracket tab is pushed outward to place the depending bracket leg at the desired distance from the end cap and the screw is retightened. The depending leg will contact the inward facing surface of the brake pad when it is retracting, and will provide a means of adjusting the outward travel required by one plunger relative to the other. The travel adjustment prevents one brake pad from contacting a wheel before the other and aids in providing simultaneous contact of the brake pads with the wheel sidewall.

The operation of the alternate embodiment should be obvious from the foregoing description and will not be explained in detail to avoid unnecessary repetition. Rather than one housing disposed centrally between the wheels, the alternate embodiment utilizes two separate wheel engaging assemblies, one adjacent each stationarily mounted wheel. The flexible cable from the hand grip member is connected by a "Y" cable connection to the extended end of the lever member and the operation of the internal components is substantially the same as the operation of the first embodiment.

While this invention has been described fully and completely with special emphasis upon a preferred embodiment, it should be understood that within the scope of the appended claims the invention may be practiced otherwise than as specifically described herein.

I claim:

1. A hand brake apparatus for installation on wheeled trucks of the type having a load supporting frame and at least two laterally opposed support wheels having a fixed direction supporting the frame for movement over the ground and an handle portion for moving and directing the load supporting frame, said hand brake apparatus comprising:

an elongate hollow tubular housing formed of square tubing releasably attached to the load supporting frame horizontally between and parallel to the rotational axis of two laterally opposed support wheels having a fixed direction, said tubular enclosed at least one end by an end cap having a central hole therethrough, at least one extensible rectangular bar retractably carried within said housing and having a cylindrical portion extending through said end cap hole and extensible outwardly from said enclosed end, a brake pad of resilient material removably secured on the outer end of said cylindrical portion to frictionally engage the sidewall of said wheels in the extended position and thereby prevent rotation thereof, a cam member rotatably mounted in said housing in operative engagement with the inward end of said rectangular bar to move said brake pad axially outward relative to said enclosed end upon rotation thereof, hand lever means releasably attached to said load supporting frame handle portion in position to be grasped by one hand and operatively connected to said cam member for rotating same to move said brake pad outwardly from the end of said housing to engage the sidewall of said support wheels, a length of cable having one end connected to said hand lever means and its other end connected to said cam member for rotating said cam member, said hand lever means comprises an elongate tubular housing having a clamp assembly for releasably securing same to the load supporting frame handle portion and at least one elongate bar slidably mounted in said hand lever tubular housing and adapted at its lower end to receive one end of said cable and a hand grip lever member secured to said sliding bar to manually slide same within said hand lever tubular housing to cause rotation of said cam member, a link member adjustably connected to said one member and said cable for connection in varying angular positions relative to the cam rotational axis for selectively altering the amount of pivotal movement required to rotate said cam member to effect movement of said rectangular bar, and a compression spring carried on said rectangular bar cylindrical portion in said elongate hollow tubular housing and biased between said cap and the rectangular portion of said bar for maintaining said brake pad in a normally retracted position spaced inwardly adjacent the wheel sidewall.

2. Hand brake apparatus according to claim 1 comprising two said rectangular bars retractably carried within said elongate hollow tubular housing in opposed relation and each having a cylindrical portion extensible outwardly one from each end thereof in opposed lateral direction upon rotation of said cam member to engage the sidewall of the adjacent said support wheel and thereby prevent rotation thereof.

3. Hand brake apparatus according to claim 2 including an adjustment stop bracket movably secured at at least one end of said elongate hollow tubular housing and having a depending portion substantially surrounding said rectangular bar cylindrical portion and capable of being secured at varying distances spaced axially from the end of said elongate hollow tubular housing a sufficient distance to engage said brake pad in the retracted position and thereby selectively control retraction and extension of one rectangular bar member relative to the other for providing simultaneous contact of said brake pads with the wheel sidewalls.

4. Hand brake apparatus according to claim 1 including at least one mounting flange extending from each said end cap and provided with holes for mounting said elongate hollow tubular housing on the load supporting truck frame.

5. Hand brake apparatus according to claim 1 including a clamp assembly on said elongate hollow tubular housing for releasably securing same to the load supporting truck frame.

6. Hand brake apparatus according to claim 1 wherein said one member comprises a lever member pivotally mounted on said elongate hollow tubular housing and operatively connected by said cable to said hand lever means to move said brake pad axially outwardly from the end of said elongate hollow tubular housing upon pivotal movement thereof.

* * * * *